United States Patent [19]
Kiamilev et al.

[11] Patent Number: 5,951,627
[45] Date of Patent: Sep. 14, 1999

[54] PHOTONIC FFT PROCESSOR

[75] Inventors: Fouad E. Kiamilev, Charlotte, N.C.; Ashok V. Krishnamoorthy, Middletown, N.J.; Richard G. Rozier, Charlotte, N.C.

[73] Assignee: Lucent Technologies Inc., Murray Hill, N.J.

[21] Appl. No.: 08/748,857

[22] Filed: Nov. 14, 1996

Related U.S. Application Data

[60] Provisional application No. 60/019,119, Jun. 3, 1996.

[51] Int. Cl.$^6$ .................................................. G06F 15/00
[52] U.S. Cl. ........................................ 708/404; 708/407
[58] Field of Search ........................... 364/726.01–726.07

[56] References Cited

U.S. PATENT DOCUMENTS

| | | | |
|---|---|---|---|
| 4,689,762 | 8/1987 | Thibodeau, Jr. ................ | 364/726.07 |
| 5,034,910 | 7/1991 | Whelchel et al. .............. | 364/726.05 |
| 5,093,801 | 3/1992 | White et al. .................. | 364/726.02 |
| 5,233,551 | 8/1993 | White .......................... | 364/726.06 |
| 5,365,470 | 11/1994 | Smith .......................... | 364/726.04 |

*Primary Examiner*—Emmanuel L. Moise

[57] ABSTRACT

A high-performance photonic chipset for computing 1-D complex fast Fourier transform (FFT) calculations. Flip-chip integration is used to combine submicron CMOS ICs with GaAs chips containing 2-D arrays of multiple-quantum wells (MQW) diode optical receivers and transmitters on each chip in the set. Centralized free-space optical interconnection offers higher throughput rates, greater external bandwidth and reduced chip count compared to conventional electronic FFT devices using hard-wired interconnection between chips. The memory addressing used provides one-to-one interconnections for memory transfers between computational stages that are compatible with several known three-dimensional free-space optoelectronic packaging technologies and dual-port memory is used to permit simultaneous read-write access to adjacent addresses in the data banks needed by each stage.

10 Claims, 10 Drawing Sheets

BANK 0

| ADDRESS | | | | |
|---|---|---|---|---|
| 0 | 0,1 | 2,3 | 4,5 | 6,7 |
| 1 | 16,17 | 18,19 | 20,21 | 22,23 |
| | ... | ... | ... | ... |

BANK 1

| ADDRESS | | | | |
|---|---|---|---|---|
| 0 | 8,9 | 10,11 | 12,13 | 14,15 |
| 1 | 24,25 | 26,27 | 28,29 | 30,31 |
| | ... | ... | ... | ... |

BANK 2

| ADDRESS | | | | |
|---|---|---|---|---|
| 0 | N/2,N/2+1 | N/2+2,N/2+3 | N/2+4,N/2+5 | N/2+6,N/2+7 |
| 1 | N/2+16,N/2+17 | N/2+18,N/2+19 | N/2+20,N/2+21 | N/2+22,N/2+23 |
| | ... | ... | ... | ... |

BANK 3

| ADDRESS | | | | |
|---|---|---|---|---|
| 0 | N/2+8,N/2+9 | N/2+10,N/2+11 | N/2+12,N/2+13 | N/2+14,N/2+15 |
| 1 | N/2+24,N/2+25 | N/2+26,N/2+27 | N/2+28,N/2+29 | N/2+30,N/2+31 |
| | ... | ... | ... | ... |

PHOTONIC FFT PROCESSOR

This application claims benefit of Provisional Appln. 60/019,119 filed Jun. 3, 1996.

BACKGROUND OF THE INVENTION

1. Field of the Invention

The invention is broadly directed to methods and apparatus for combining discrete integrated circuits. In particular, the invention pertains to free-space interconnection of discrete integrated circuits.

2. Discussion of Related Art

Free-space optical interconnection (FSOI) of integrated circuits allows efficient implementation of high-performance parallel computing and signal processing systems. Various architectures and system designs for application-specific FSOI systems have been discussed and demonstrated. However, for applications beyond mere switching and backplane interconnection, little consideration has been given to the impact of IC layout constraints on FSOI system design and performance. Layout constraints affecting the complex processor interconnections required for performing FFT calculations are critically important to fully realizing the potential advantages of FSOI for fast-Fourier-transform (FFT) circuits.

The fast-Fourier-transform (FFT) calculation is a critically important feature of signal processing, telecommunications, speech processing, and high-speed control and instrumentation operations. Various hardware implementations of the FFT calculation have been developed. These conventional processors combine multiple processor and memory chips packaged using multi-chip modules (MCM's) or printed-circuit boards (PCB's) or backplane wiring to interconnect them.

The Discrete Fourier Transform (DFT) of an N-point sequence of values where k=0, ..., N−1, is:

$$X(k) = \sum_{n=0}^{N-1} x(n) e^{-j\frac{2\pi}{N}i}$$

Since this formula leads to a large number of computations with $N^2$ complex multiplications and $N(N-1)$ complex additions, short cuts are used. The FFT algorithm, developed from the DFT by Cooley and Tukey, is a well-known example of one such short cut. The speed advantage enjoyed by the FFT algorithm was gained by eliminating repetitive computations of an exponential term that is necessary in the DFT equation.

Figure 1:
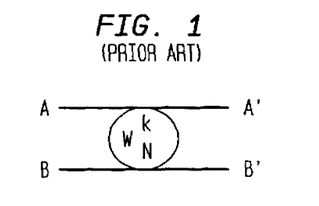
FIG. 1 is a schematic diagram of a radix-2 butterfly processor.

The FFT algorithm comprises a series of multiplication and addition processes which are performed in distinct stages. These processes can be implemented using the butterfly processor (BP) device shown in FIG. 1. The butterfly-processor data flow diagram in FIG. 2, graphically shows the processor interactions that define the various stages of an FFT calculation. To evaluate N points, the FFT is calculated using N/radix# butterfly processor devices per stage in $\log_{radix\#} N$ stages.

Figure 2:
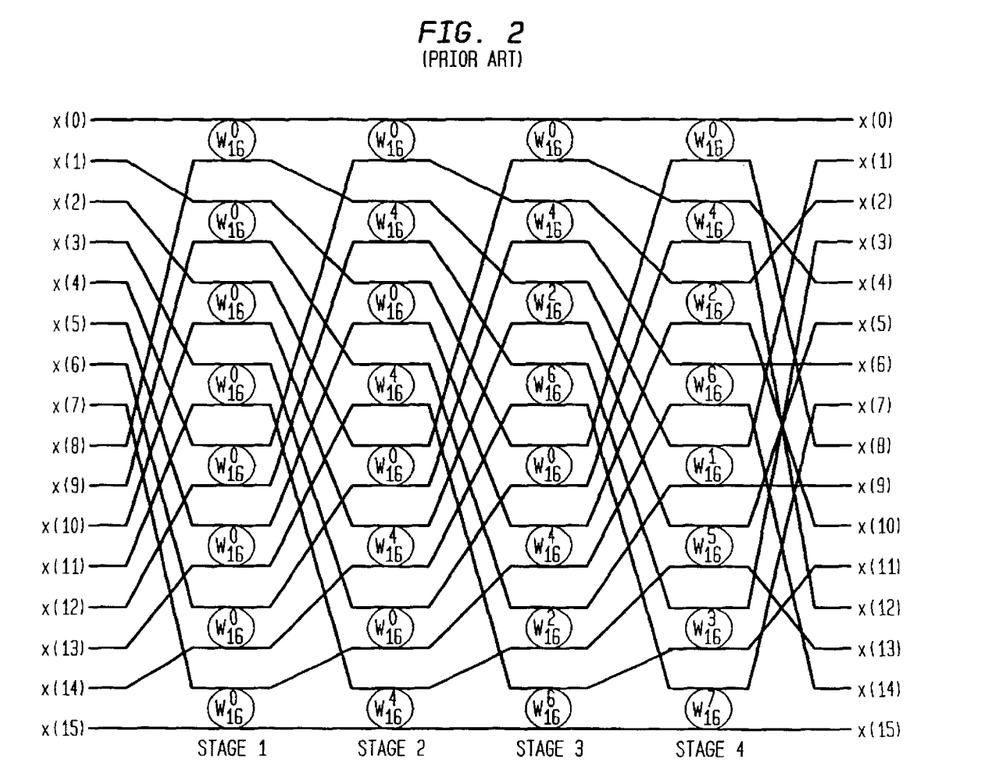
FIG. 2 is a schematic diagram of a sixteen-point FFT processor array.

The radix-number determines how many inputs and outputs the BP device has. Radix-2 butterflies have N/2 BP devices per stage and $\log_2 N$ stages, and each BP device has two inputs and two outputs. For example, FIG. 2 shows an implementation of a 16-point FFT having 4 stages with eight BP devices per stage. The inputs to the FFT calculation are sample values taken at time-domain data points. Its outputs are values for discrete frequency-domain data points. The FFT equations used for a radix-2 BP device are:

$$A = A + W_N^k B$$

$$B = A - W_N^k B$$

A and B are complex numbers. The expression $W_N^k$ is referred to as the "twiddle factor" and its value is computed as:

$$W_N^k = e^{-j2\pi \frac{k}{N}}$$

For actual hardware implementation of the FFT, the FFT equations are broken down into real and imaginary components that can be quite simply implemented using 4 multipliers and 6 adders, and using 2's-complement conversion by inverters and the carry-in bit on the adder to perform subtractions:

$$A_R = A_R + B_R W_R - B_I W_I$$

$$A_I = A_I + B_R W_I - B_I W_R$$

$$B_R = A_R + B_R W_R - B_I W_I$$

$$B_I = A_I + B_R W_I - B_I W_R$$

Theoretically, BP devices having a higher radix value are more computationally efficient, in that they have fewer multipliers relative to the number of points processed. For example, a radix-4 processor uses 12 multipliers to process 4 data points, while an analogous radix-2 processor requires 16 multipliers to process 4 data points. However, the computational-efficiency of the higher-radix processors is paid for in increased design complexity.

In particular, only one twiddle factor is required by each of the radix-2 BP devices and that twiddle factor is computed using a relatively simple bit-reversal operation. Higher-radix BP devices require multiple twiddle factors for each BP device that are computed using more complex algorithms. This added degree of complexity in computation and distribution is pivotal when multiple devices must be integrated on a single VLSI chip. The problem of correctly computing and distributing twiddle factors for these higher-radix BP devices is a practical barrier to their commercial implementation.

Also, the fastest architecture for computing an FFT result would be a fully-parallel system with $N/2 \times \log_2 N$ BP devices, for example: 53,248 BP devices for an 8192-point FFT, theoretically. However, since each BP device is about 1.8 mm×2.5 mm in a 0.5 cm CMOS technology, only sixteen fit on one die. Therefore 3,328 die are required and a single Multi-Chip Module (MCM) implementation for this many die is impractical. A multiple MCM implementation would be possible, but BP-device architecture requires the connection of each BP device be connected to 4 other BP devices, 212,992 connections between die. Partitioning this massive circuit is a difficult problem, geometrically, and the timing losses resulting from the distances traversed by those connections is a serious drag on processor performance, compromising the speed advantage of a massively parallel design.

FSOI devices enjoy the efficiency benefits of low-power surface-normal optical interconnect technology and speed and cost benefits of the high-volume VLSI fabrication processes. The result is fast, low-latency inter-chip interconnects that eliminate several layers of electronic fabrication and packaging. CMOS-SEED devices use multiple quantum-well (MQW) diode devices, which operate either as optical-output reflection modulators or optical-input photodetectors. The quantum-well diodes are bonded to the CMOS device's surface and electrically interconnected in a grid located directly over the silicon circuits. The diodes in the grid run at the speed of the underlying silicon technology, in a small area, at low power, and in high-density input and output arrays with added design flexibility provided by the diodes dual-operability as either input or output elements.

Hybrid CMOS-SEED technology is particularly advantageous for FSOI applications, and is rapidly becoming widely available and well-known. Hybrid CMOS-SEED devices integrate high-speed GaAs MQW photodetectors and modulators with the high-volume commodity CMOS VLSI processes are usable for high-speed FFT processing. However, implementing a conventional free-space optical butterfly configuration between the 16 BP devices on the respective die requires 13,312 optical connections between the die. For a high-speed FFT design, every optical connection would have to be at least a 32-bit parallel connection, simultaneously providing 425,984 beams of light while preserving the topology of the butterfly structure. The logistics of this theoretically possible parallel PFFT processor design renders it impractical for implementation in either type of CMOS-SEED technology.

Alternatively, a serial-connection design that pairs one BP device with memory sufficient to keep track of its data provides a more compact implementation of the FFT calculation. This is also a much less expensive processor design. However, 53,248 passes are required to complete the calculation, each pass being a complete radix-2 calculation by that one BP device. This is too slow for real-time applications.

Finally, multi-chip feedforward optical interconnect systems that provide so-called "smart-pixel" arrays by combining polarization with space-division multiplexing and polarization with pupil-division multiplexing to optically shuffle FFT data are known. However, conventional smart-pixel applications such as photonic switching use cascaded optical connections between chips that are strictly feedforward. Such feedforward optical systems lack the flexibility needed for implementing even feedback, much less the bi-directional communication required to link the BP devices to the memory need to implement workable optical interconnection in multi-chip FFT systems.

SUMMARY OF THE INVENTION

A fast, flexible FFT calculation system is provided in accordance with the present invention using an array of electrically interconnected processor devices that is connected to optical interconnection pixels disposed to transfer data to and from the array, and to a source of factor values including a multiplexer for supplying selected factor values to respective processor devices.

In a particular preferred embodiment radix-2 butterfly processors are connected in a partially-parallel system and the array is constructed using hybrid CMOS-SEED fabrication for providing the optical interconnection pixels.

Preferably the factors are twiddle factors stored in the factor source and supplied to respective processor devices from storage and the factors for respective stages $S_x$ of the fast Fourier transform calculation using N data points are determined using the $S_x-1$ most significant bits of the bit-reversed binary representations of the numbers between 0 and N/2−1.

In a particular embodiment, factor selection means is responsive to a given stage $S_x$ to provide a respective predetermined factor from the stored values through the factor multiplexer to each processor device.

The FFT calculation system also uses a random access memory device that includes optical interconnection pixels disposed to transfer data to and from the memory device.

Preferably a centrally-located array of photonic devices is connected to the array of electrically-interconnected processor devices and includes optical interconnection pixels that are disposed to transfer data to and from the memory device. Also, direct one-to-one interconnections are preferably provided between the processor array and the random-access memory. The direct, one-to-one connections are also advantageous because they are compatible with a number of emerging three-dimensional free-space optoelectronic packaging technologies.

In a preferred embodiment shuffle means relocates data between stages so that data from a previous stage can be read directly into a next stage without reassigning interconnection pixels used by the processor arrays to read data from the previous stage. In a particular embodiment shuffle means uses a smart-pixel device to provide space-division relaying of data transfers between the array and the memory device and address reallocation in the output from the memory device.

In a particular embodiment processor arrays having respective factor sources are cascaded, and the use of a dual-port random access memory permits data to be read and written in adjacent addresses in the memory device simultaneously.

Preferably an optical-polarization space-division relay between the memory device and the array of processor devices directs data to and from the memory device and address allocation means for shuffling data stored in the memory device when it is supplied to the array of processor devices.

BRIEF DESCRIPTION OF THE DRAWINGS

The features and advantages of the present invention will be better understood when the description of a preferred embodiment provided below is considered in conjunction with the drawings provided, wherein.

DETAILED DESCRIPTION OF THE PREFERRED EMBODIMENTS

A high-performance chip set in accordance with a first embodiment of the present invention consists of a Photonic FFT (PFFT) chip and a pair of Photonic RAM (PRAM) chips. The two basic elements of this FFT processor design, the PFFT and the PRAM, constitute a cascadable element of a compound FFT chip set, in accordance with a second embodiment of the invention.

The fastest and largest such compound chip set is one that combines $\log_2 N$ PFFT's and PRAM's in a pipelined FFT system. The system's modularity permits any number of PFFT/PRAM' elements between this ultimate high-performance configuration and the smallest but slowest configuration of a single PFFT and two PRAM's to be employed.

Figure 4:
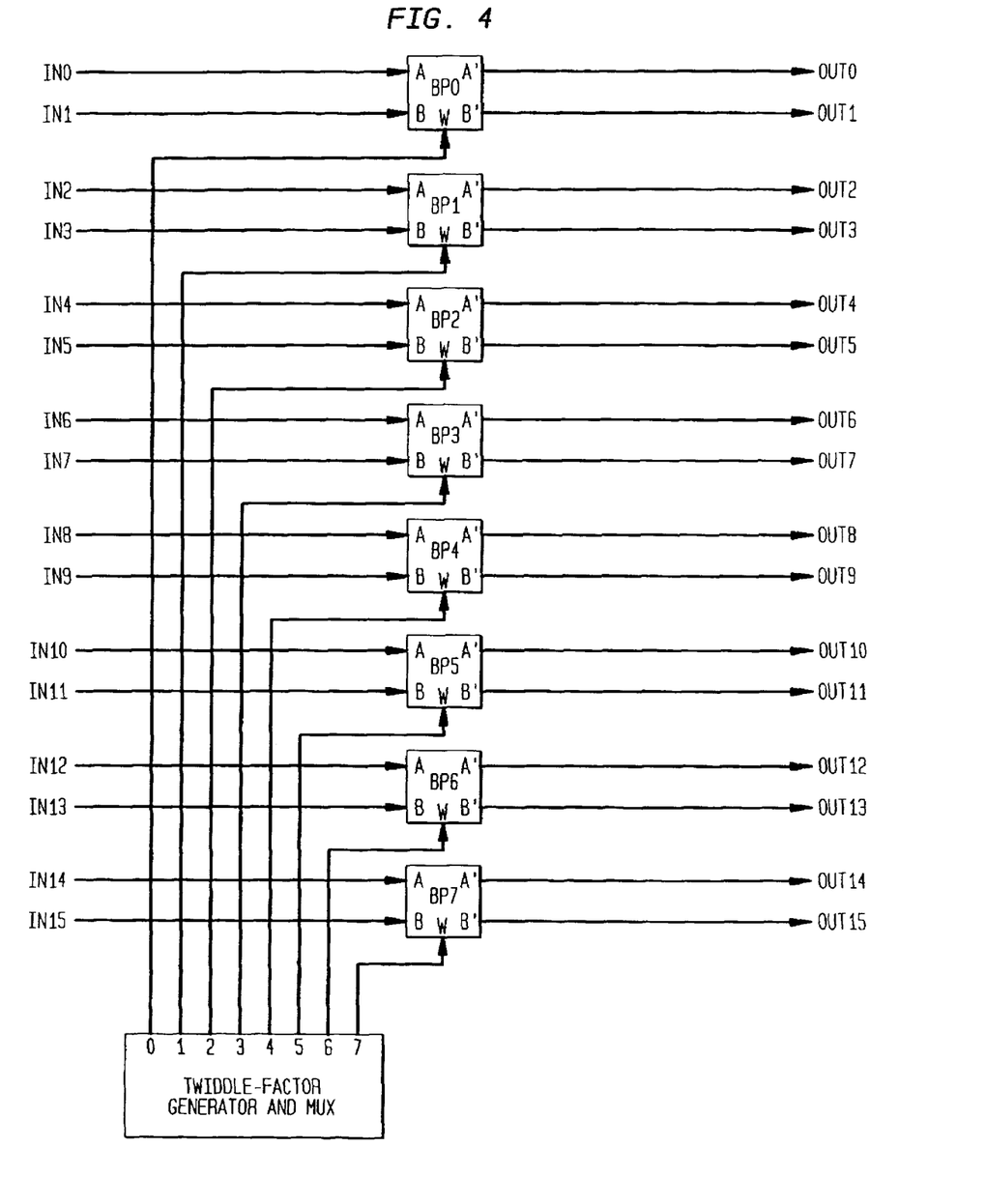
FIG. 4 is a schematic diagram of the processor connection on a PFFT chip in accordance with the present invention.

A semi-parallel interconnection of eight radix-2 BP devices on the PFFT chip, shown in FIG. 4, provides eight sets of butterfly processor calculation results per clock cycle to optical data-storage connections connected to the respective output lines $OUT_n$. A complete photonic FFT processor for tasks requiring as many as 8,192 data points can be built using just this PFFT and two PRAM chips. The photonic FFT processor provides significantly increased performance and reduced chip count relative to purely electronic FFT processors.

After an initial data set is loaded into PRAM 0, the single-PFFT system shown in FIG. 8, operates as follows:

1. A first-stage FFT result is calculated by the PFFT for the data points to be processed, 16 points at a time, using the data set stored in PRAM 0 that is input in parallel on respective input lines $IN_n$, and the result is stored in PRAM 1 over output lines $OUT_n$.

2. The next stage FFT is calculated using data read from PRAM 1 and the result is stored in PRAM 0 in the same manner.

3. These two stages reiterate in a ping-pong fashion until the FFT is complete.

Memory Management

Figure 5:
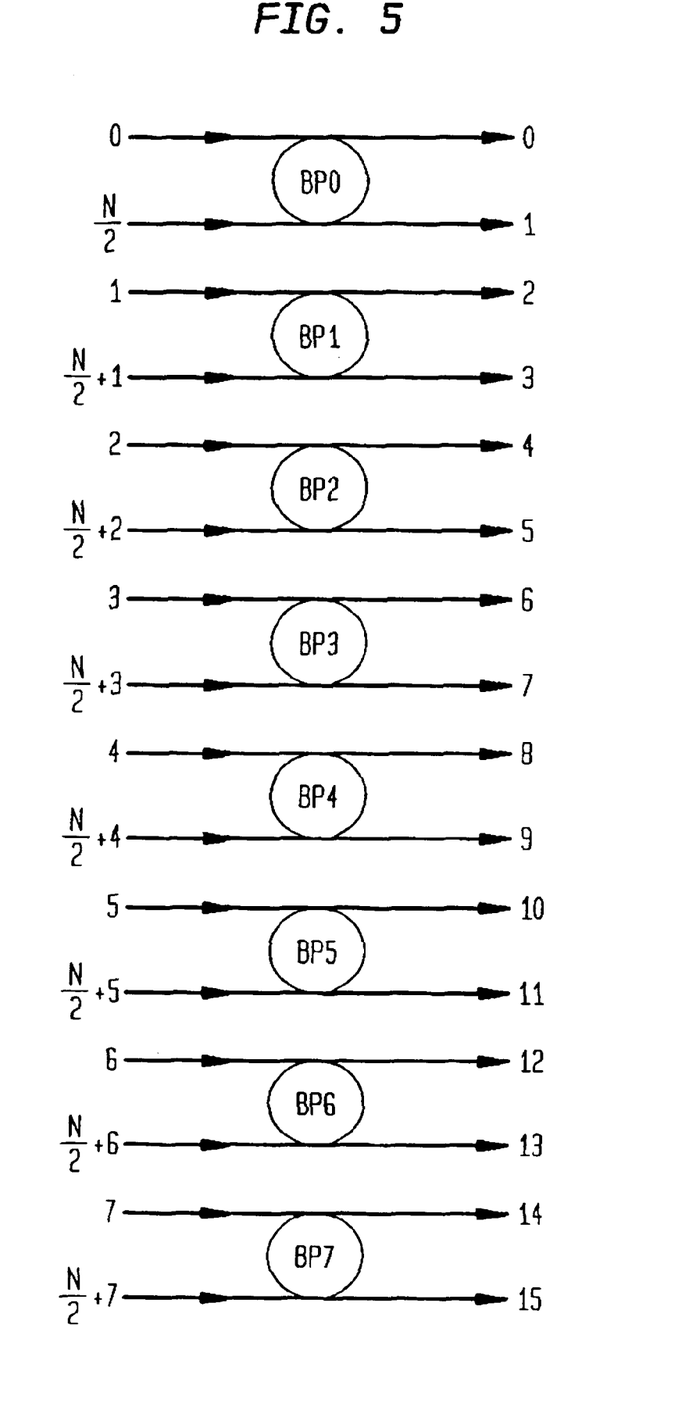
FIG. 5 is a diagram of the data storage and retrieval ordering of the PFFT chip of FIG. 4.

The inputs and outputs of the eight BP devices are each connected to optical receivers and transmitters, and a twiddle factor generator. The eight BP devices on the chip are loaded with data from the separate PRAM memory chip and operate in parallel on data for the same single stage of the calculation at all times as follows:

1. All of the data for one stage is entered into the eight BP devices 16 points at a time, where each retrieval of 16 points is executed during one clock cycle. A perfect data shuffle required for the FFT is achieved by reading two data points that are spaced N/2 apart into each BP device, as shown in FIG. 5.

2. The data that comes out of the BP devices is stored in memory until it is needed to calculate in the next stage of the FFT. Each 16 points of data input are received and 16 points of output is stored in one clock cycle and, unlike the input data points, the output points are cached as consecutive data points.

3. Each stage reads data from one memory unit and stores data in another, in alternation, until all the data from one stage has been processed and stored. The data results of the next stage are then calculated in the same fashion using the numbers just stored in the previous stage, but shuffled again when read out from the memory unit in which it was stored, and using another set of respective twiddle-factor values for each BP device selected for the current stage.

Figure 6:
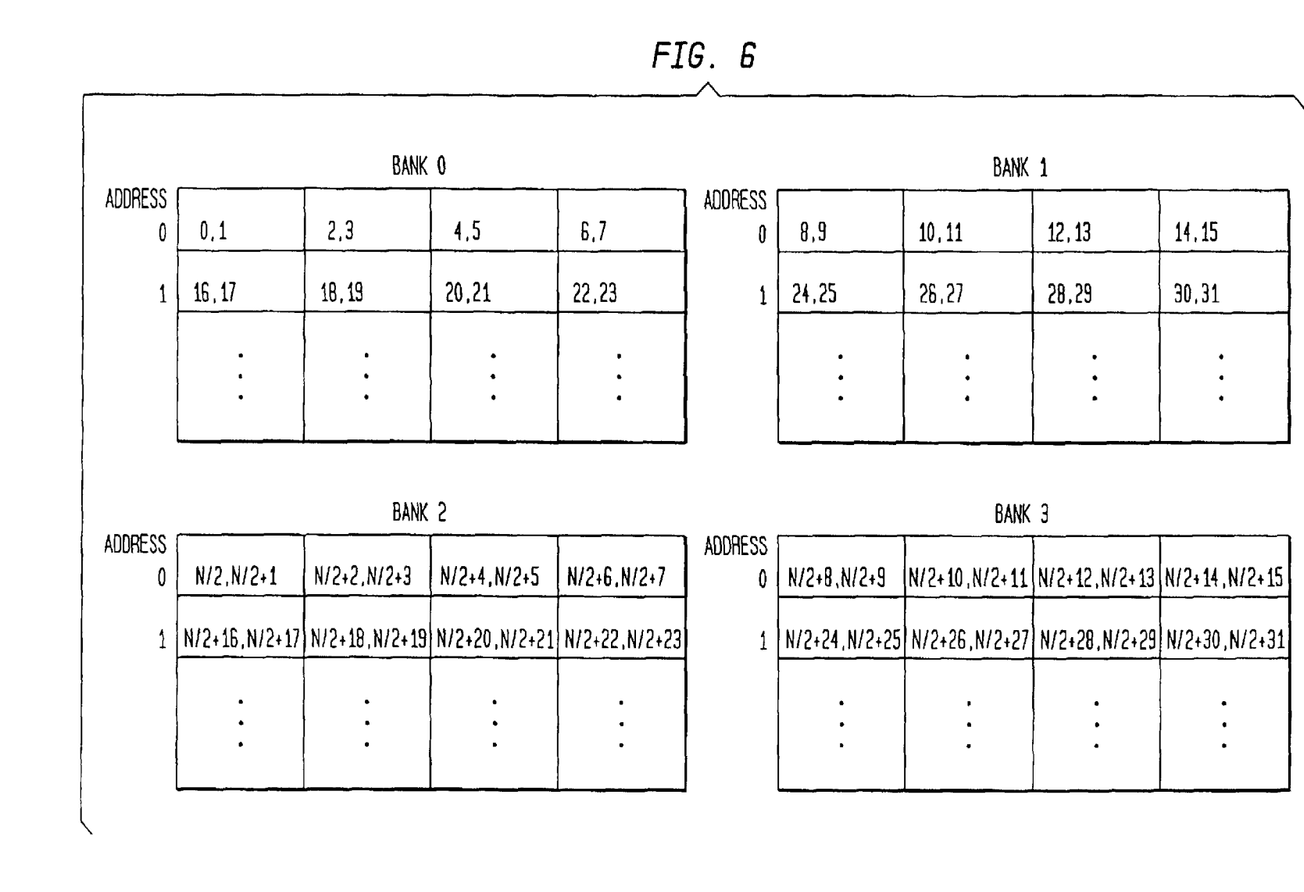
FIG. 6 is a schematic diagram of the PRAM virtual memory banks used in FIG. 5.

With all eight BP devices on the PFFT chip operating continously and in parallel, a specially-modified data routing scheme is needed. Holographic optical rerouting has been used in conventional FFT devices, but this routing is preferrably implemented in the PRAM by the output address multiplexing of data addresses to a selected beam in the array of beams reflected from the transmitter array on the PRAM chip. The PFFT chip shown in FIG. 4 uses the PRAM memory shown in FIG. 6, which is divided into 4 banks of RAM. Each bank of RAM is further subdivided into four physical blocks of storage as indicated by the dashed lines in FIG. 6.

When reading data into the PFFT chip, banks 0 and 2 will be read from at the same address, first. Then, banks 1 and 3 will be accessed at the same address. This alternation between even-numbered and odd-numbered banks insures that all the BP devices are supplied with data simultaneously and that each BP device gets data inputs that are N/2 points apart from each other, as indicated in FIG. 5. Data for two points is read at consecutive addresses simultaneously from banks 0 and 2 and then from banks 1 and 3, in alternation, until all the data for the points processed by that PFFT has been read.

In contrast, 16 consecutive points of data are all written simultaneously on each pass when storing data, seen in FIG. 5. Therefore, the two outputs are stored at the same address in respective banks 0 and 1. For example, on pass number 1, data points 0 through 15 will result from the BP-device computations and are stored in address 0 of banks 0 and 1. On the next pass, the outputs are stored in the next address of banks 0 and 1. This repeats until banks 0 and 1 are full. Then, the routine proceeds to write to the same successive addresses of banks 2 and 3. The data storage for the stage is complete when banks 2 and 3 are full.

Because this modified data access scheme shuffles data between stages without any physical reordering of the data, data from the previous stage can be read directly into the current stage with no transformations.

Figure 9:
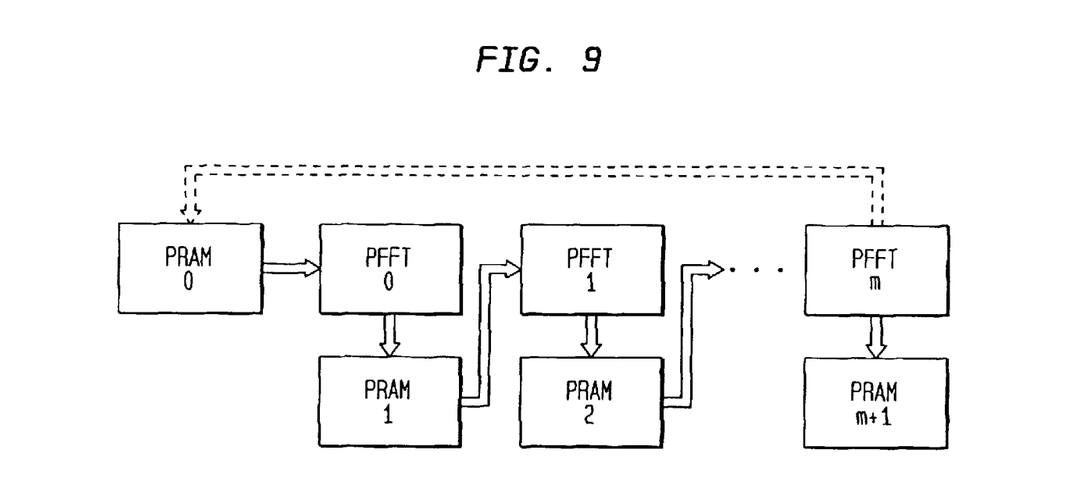
FIG. 9 is a diagram of the cascade of processors for the second embodiment.

The cascaded PFFT system shown in FIG. 9 is a pipelined structure, requiring m PFFT's and m+1 PRAM's for maximum performance, where $m=\log_2 N$. The initial data set is stored in PRAM 0. The final result is stored in PRAM m+1 or can be read directly from PFFT m. If, however, fewer than m PFFT's are chosen for the system the FFT calculation will proceed as before, but the data from the last PFFT is "wrapped around" and stored in PRAM 0, as indicated by the dashed feedback line in FIG. 9.

Normally, in pipelined operations, the next stage must wait for the last stage to store data before that next stage can access any data in that same memory device. This delays data flow. Maximum pipeline throughput and efficiency requires dual-port access to each of the four RAM subdivisions in each bank of the PRAM unit which permits access to data from the last stage while data from the next stage is being wrtiiten into the same memory block at another address simultaneously. This eliminates PRAM read/write delays from the FFT calculation.

Twiddle-factor Generator

The set of twiddle-factor values used by the BP devices of the PFFT chip is different for each stage of the FFT calculation. The exponent k of the twiddle factor expression $W_N^k$, is the stage-dependent variable in that expression. The index N simply reflects the number points professed. For the embodiment shown in FIG. 8, the value of k ranges from 0 to N/2−1, since there are N/2 BP devices per stage.

Eight different twiddle factors are not always needed for the eight different BP devices. Depending on the stage $S_x$ in the calculation either 1, or 2, or 4, or 8 different twiddle factors are needed. Determining individual twiddle factors for the BP devices is not difficult, but supplying eight variable twiddle factors to each stage of the FFT calculation simultaneously and in a timely manner is.

Figure 7:
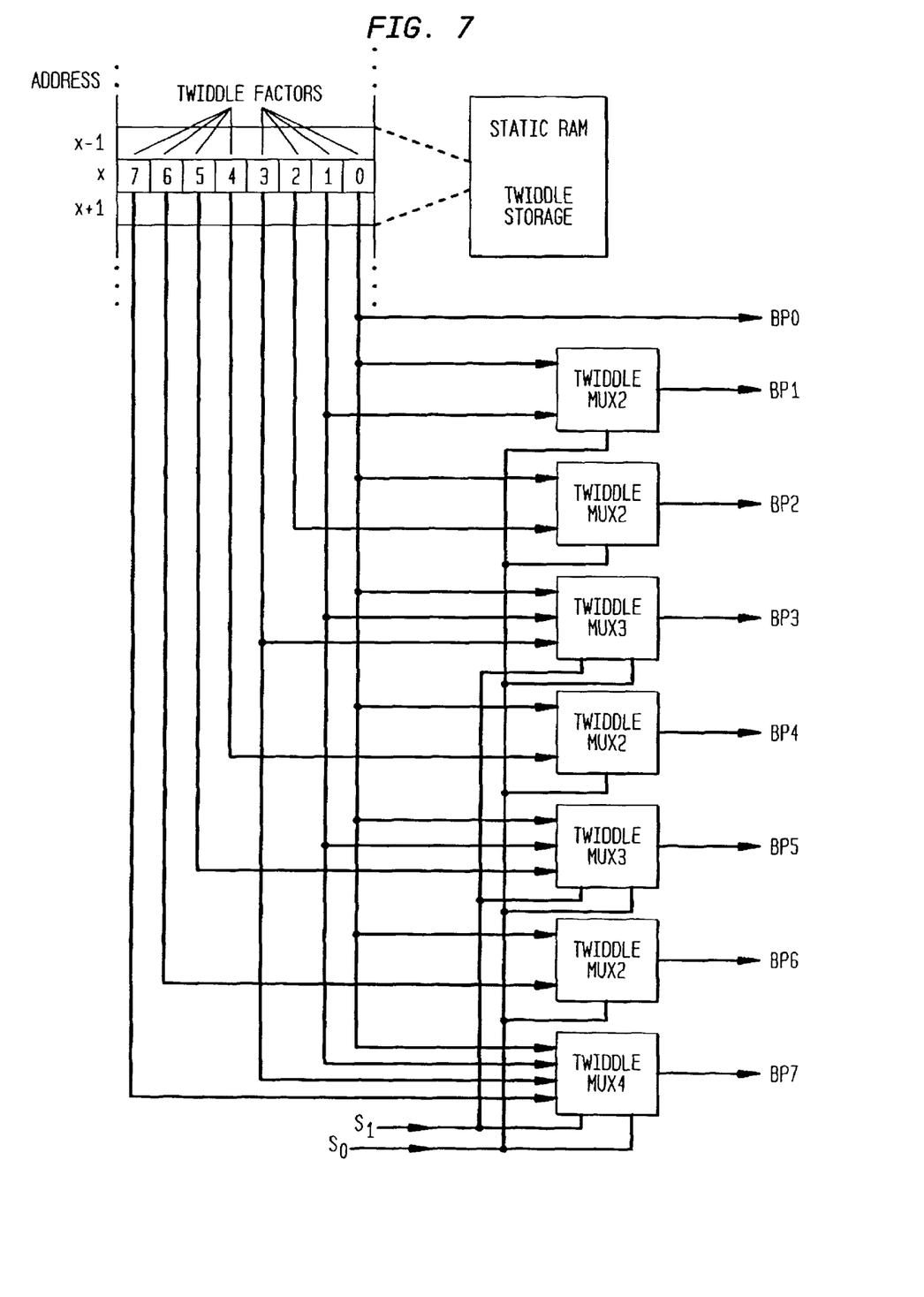
FIG. 7 is a schematic diagram of the twiddle-factor generator of FIG. 4.

However, we have discovered that the twiddle factors required by radix-2 BP devices are uniquely well-suited to modular PFFT implementations of the PFFT. The twiddle-factor generator shown in FIG. 7 is particularly well-suited for 8-BP configuration of the PFFT. The bit-reversal algorithm that determines the values of k is as follows:

1. In the first stage k is always 0, but for the remaining stages, binary representations of numbers between 0 and N/2−1 are written with their bits reversed.

2. For the second stage, the most significant bit (MSB) of each bit-reversed number that was just written is taken as the value of k for each respective BP device in the stage. Only the first bit is kept, the rest of the bits in the number are set to zero and this second-stage set of twiddle factors is stored at its own respective address. These values of k for the second stage of the FFT calculation toggle between 0 and N/4.

3. The number of bits kept for the third stage is equal to the stage number $S_x$ minus 1, and the value of k for subsequent stages is determined in a similar fashion, that is, the three most significant bits would decide the magnitude of k for the fourth stage, etc.

Rather than separately storing twiddle factors for each stage, once all eight bit-reversed values for k have been determined, for the 16-point task a set of eight different twiddle factors corresponding to the eight different values of k is calculated and stored in the static RAM (SRAM) device on the PFFT chip shown in FIG. 7. Only N/2 different twiddle factors used for an N-point FFT calculation are stored at the addresses x used for twiddle factors in the SRAM of the PFFT chip, not sets of twiddle factors for respective stages of the calculation. Twiddle factors are stored in bit-reversed order at each address in consecutive positions 0 through 7, and so that all eight different twiddle factors are available for the eight BP processors at that one address. Six values of k and the locations where the twiddle factors are stored that are needed by an 8-BP processor array during the first four stages of a 64-point FFT task are:

| BP# | bit-reversed binary | #TF$_1$ | #TF$_2$ | #TF$_3$ | #TF$_4$ |
|---|---|---|---|---|---|
| 0 | 00000 | 0 | 0 | 0 | 0 |
| 1 | 10000 | 0 | 1 | 1 | 1 |
| 2 | 01000 | 0 | 0 | 2 | 2 |
| 3 | 11000 | 0 | 1 | 3 | 3 |
| 4 | 00100 | 0 | 0 | 0 | 4 |
| 5 | 10100 | 0 | 1 | 1 | 5 |
| 6 | 01100 | 0 | 0 | 2 | 6 |
| 7 | 11100 | 0 | 1 | 3 | 7 |

Figure 12:
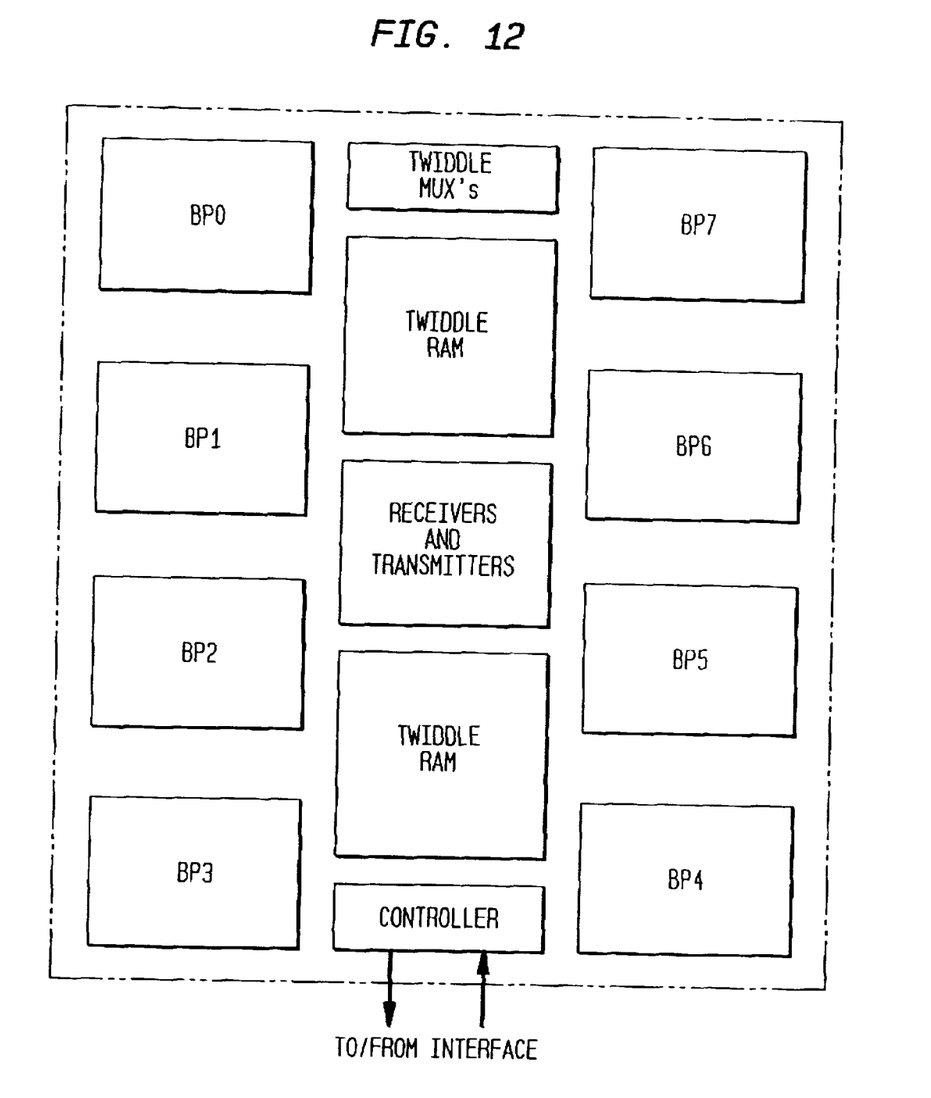

The twiddle multiplexers shown in FIGS. 7 and 12 determine what subset of the eight different twiddle factors will be sent in what order to the eight BP devices, as required by the allocation table shown above. Thus twiddle-factor allocation is preferably controlled by selecting the address where all eight different k values are stored and using the multiplexer select lines to pass the correct twiddle factors from the stored array of eight different factors to respective BP devices at each stage of the calculation.

Storing only N/2 twiddle factors in this way, rather than N/2 xlog$_2$N twiddle factors, saves a large amount of storage space without introducing processing delays. If N/2 xlog$_2$N twiddle factors were stored, those needed for each FFT stage could be read out of the RAM directly, without the extra multiplexer circuitry used to manipulate the twiddle factor data. However, the area occupied by manipulation circuitry in accordance with the present invention is negligible relative to the area that would otherwise be required for additional RAM storage.

Power and Space Requirements

A number of hybrid SEED receiver circuits suitable for implementing the optical interconnection needed for this chip set are known. One-beam and two-beam transimpedance receivers having switching energies less than 60 fJ and operation at data-rates in excess of 800 Mb/s are known. A hybrid SEED device using one gain-stage, with two parallel MOS transistors providing feedback, requires approximately 300 $\mu m^2$ of surface area in a 0.8 $\mu m$ 5V CMOS technology.

Preferably, 768 dual-beam optical receivers and 768 dual-beam optical transmitters are used per chip. These are arranged in a 48×64 array of quantum-well diodes corresponding to a 48×32 array of transmitters and receivers. The floorplan for the proposed chipsets puts the quantum well diode array in the middle of the chip. The diode array uses a 96×64 array of pads which requires 3.8 mm×2.5 mm of silicon area assuming 40 cm pad pitch. Receiver amplifier and transmitter driver circuits are placed directly under the quantum well diode array. The power consumption of the entire receiver/transmitter section is approximately 3 Watts per chip using existing transimpedance receivers. This can be reduced to 1–2 Watts with receivers optimized for low power.

Power consumption in current hybrid CMOS-SEED transimpedance receiver circuit designs, however, is typically 3–4 mW for speeds in excess of 300 Mb/s at 5V. When large numbers of receivers are integrated on a single chip, this power dissipation must be accounted for in the power budget. For example, the 768 two-beam receivers used in the FFT chipset would dissipate 2.7 W on-chip. If necessary, this value can be reduced by several means. First, the power consumption can be reduced by operating the receiver circuits at lower voltages (e.g. 3.3V). Because the FFT chip-set calls for 150 Mb/s receivers, the receiver bandwidth can be traded-in for reduced power consumption. Significant reductions in power consumption may also be accomplished with only a modest penalty in sensitivity.

The optical transmitter circuit is a CMOS inverter operating at 5V. The output of this inverter sees a pair of reverse-biased quantum well diode modulators as the capacitive load. With present the hybrid SEED process this capacitance is approximately 100 fF, which is an order of magnitude smaller than the capacitance of flip-chip or perimeter pads used for conventional electronic packaging. Lower capacitance translates directly into low on-chip power consumption. The dynamic power consumption per transmitter for the proposed chipset can be estimated using the following:

$$P_{diss} = \frac{1}{2}CV^2 f = \frac{1}{2}(100 \text{ fF})(5 \text{ V})^2(150 \text{ MHz}) = 200 \text{ } \mu W$$

In addition, an additional 200–300 $\mu W$ of power dissipation per transmitter is attributable to the photocurrent flowing through the output driver when the modulator is absorbing energy for transmission. The total power consumption is approximately 350 mW for the 768 transmitters.

Figure 8:
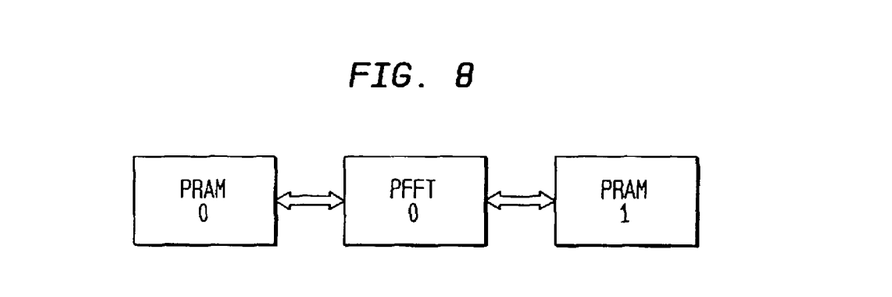
FIG. 8 is a diagram of a two-PRAM memory implementation for the first embodiment.

The simple, three-chip smart-pixel PFFT processor shown in FIG. 8 requires connections to and from a smart-pixel PRAM memory chip. The connections are simple point-to-point optical connections between the FFT processors and corresponding RAM cells on the respective photonic chips. No complex interconnect structure is necessary.

Figure 10:
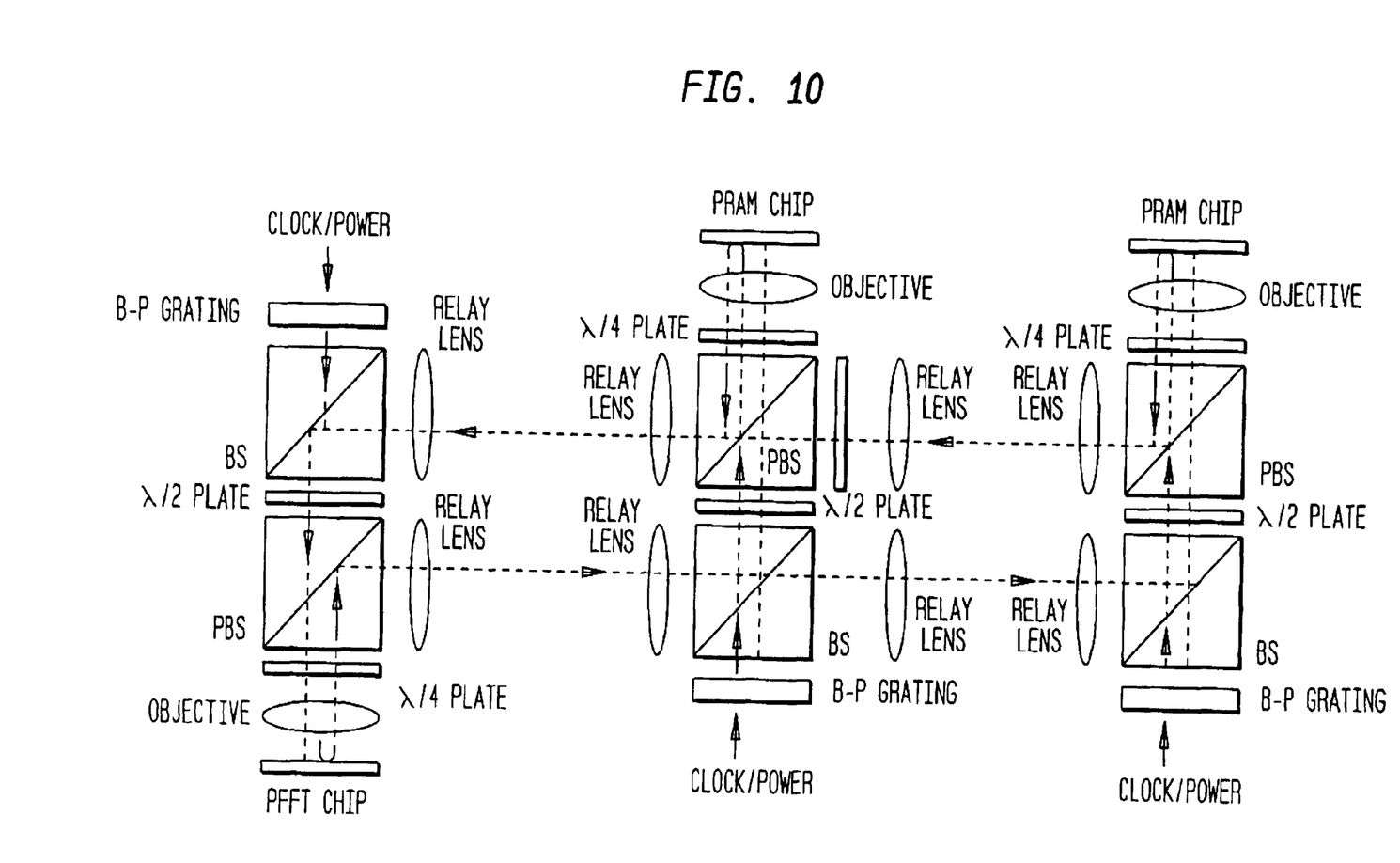
FIG. 10 is a schematic diagram of optical polarization and space-division multiplier for chip interconnection in FIGS. 8 and 9.

These connections are implemented using the optical multiplexing system shown in FIG. 10, which provides telecentric polarization and space-division multiplexing for simultaneous feedback and feedforward optical connectivity. Binary phase (B-P) gratings generate spot arrays. The respective beamsplitters (BS) and quarter-wave and half-wave plates ($\lambda/4$, $\lambda/2$) direct these beams onto respective combinations of the chips.

Both the PRAM 0 and PRAM 1 chips are connected by a single path for an array of readout beams from a PFFT chip imaged on the detectors of two PRAM chips, and a separate single path for an array of output beams from the PRAM chips imaged on the detectors of the PFFT chip. The outputs of the chips are also split to respective data I/O ports. Thus these outputs can be used to feed another PFFT-PRAM chip-module simultaneously. Since this polarization space-division relay uses two-lens 4-f imaging, which provides alternating image and Fourier focal planes, an optional Fourier-plane hologram at the focal plane between the two relay lenses may be used to provide an arbitrary space-invariant interconnection, if necessary. However, because the PRAM chips in accordance with the preferred embodiment of the present invention electronically shuffle data they output so that needs only simple one-to-one in connections, a holographic optical interconnect is not required. This simplifies system design and reduces signal loss.

A 0.5 micron HP/MOSIS high-speed, high-density 3.3V/5V CMOS14 fabrication process is used to produce a tight 1.4 micron pitch between three levels of planarized interconnects. The PRAM chip integrates over 2.5 million transistors in a die area approximately 1 cm square. The PFFT chip integrates over 1.4 million transistors in a die area approximately 1.2 cm square. Each chip has 768 optical inputs and 768 optical outputs, for a chip-to-chip bandwidth of 29 Gbytes/sec at 150 Mhz clock speed. A known holographic free-space interconnect technology is used to link these two chips.

Figure 3:
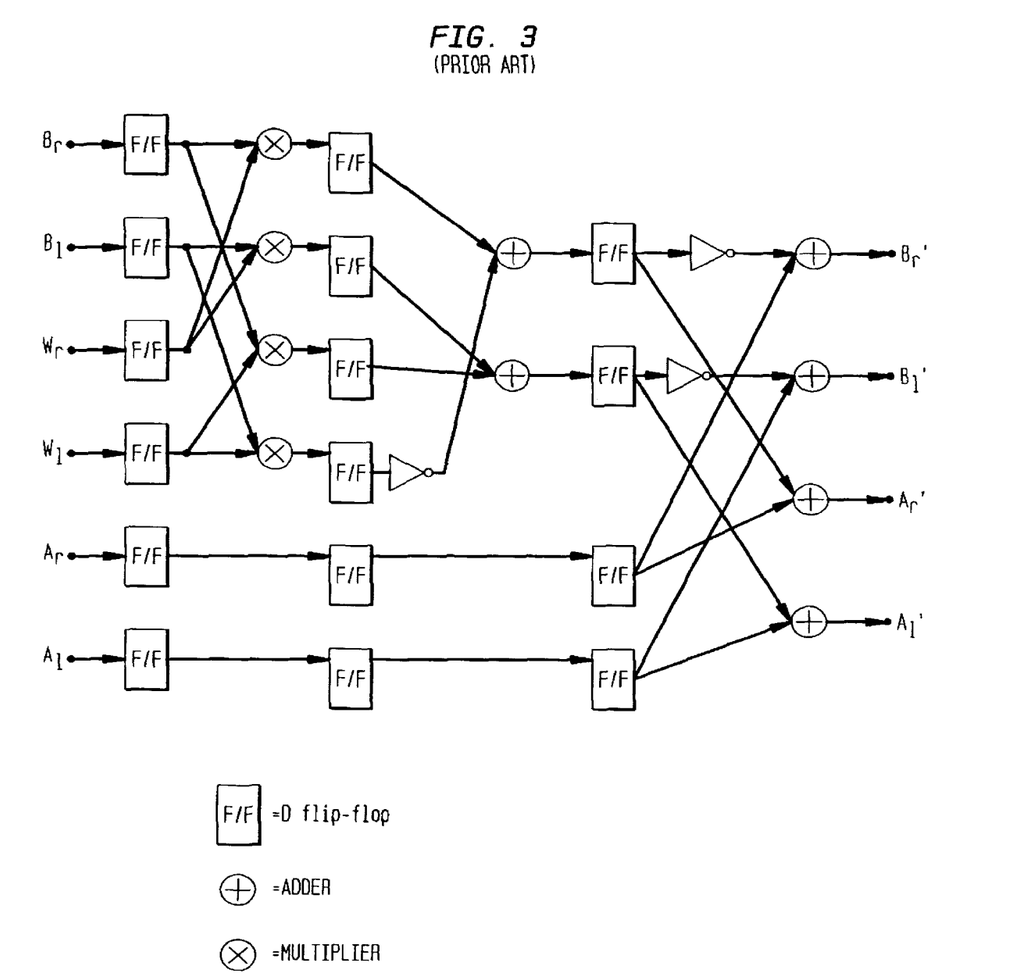
FIG. 3 is a logic diagram of the radix-2 butterfly processor of FIG. 2.

Each radix-2 butterfly processor of the PFFT chip shown in FIG. 3 uses six 24-bit adder circuits, a total of 48 adders per chip, with each using 126,000 $\mu m^2$ of chip area. The adders, using carry-select architecture with a Manchester carry chain, add two 24-bit fixed point numbers in 3 nanoseconds. They also determine overflow conditions automatically. At a speed of 150 MHZ with 1053 transistors, each adder consumes 6,980 $\mu W$.

The edge-triggered flip-flop (or register) is another important building block of the preferred PFFT chip. Each radix-2 BP device in the PFFT chip uses 368 registers to pipeline the computation, for a total of 2,944 registers per PFFT chip each using 740 $\mu m^2$ of chip area. At a speed of 150 MHZ with 34 transistors, the registers each consume 150 $\mu W$.

The most important circuit on the PFFT chip is the 24-bit multiplier circuit. Each radix-2 butterfly processor in the PFFT chip uses 4 multipliers, for a total of 32 multipliers per PFFT chip each taking up 600,000 $\mu m^2$ of chip area. The multiplier is a 2's complement pipelined multiplier that can multiply a 24-bit and a 16-bit fixed point number in under 5 nanoseconds. A modified Booth algorithm is used to produce a series of partial products, which are summed by a Wallace tree-adder circuit. A Manchester carry chain is then used to generate the final product. A register located near the middle of the multiplication, allows the multiplier module to produce results at a higher clock rate and the product is produced one clock cycle thereafter. Operating at 150 MHZ with 12,786 transistors, the multiplier consumes 46,900 $\mu W$.

High-speed static RAM (SRAM) circuits are used in both the PFFT and the PRAM chips. The PRAM chip uses 16 banks of static RAM modules organized as 256 words, each word being 96 bits (256×96), to store the data points during the FFT computation. The PFFT chips uses 2 SRAM banks to store the twiddle coefficients, each bank being sized as 512×128. The SRAM uses static address decoding for fast access times, reduced power consumption and high density. Bit storage is performed using conventional six-transistor circuit. Current-mode amplifiers are used to amplify bit line signals. Tristate output drivers are used on the data output lines and they are controlled with an output enable signal. The cycle time is 5.5 nanoseconds for the 512×128 (twiddle storage) SRAM and 5.1 ns for the 256×96 (data storage) SRAM. At 150 MHZ with 406,628 transistors, the 512×128 SRAM consumes 560 mW and has dimensions of 2.5 mm×3.3mm. The 256×96 SRAM with 155,738 transistors consumes 328 mW and has dimensions of 1.8 mm×1.8 mm.

Figure 11:
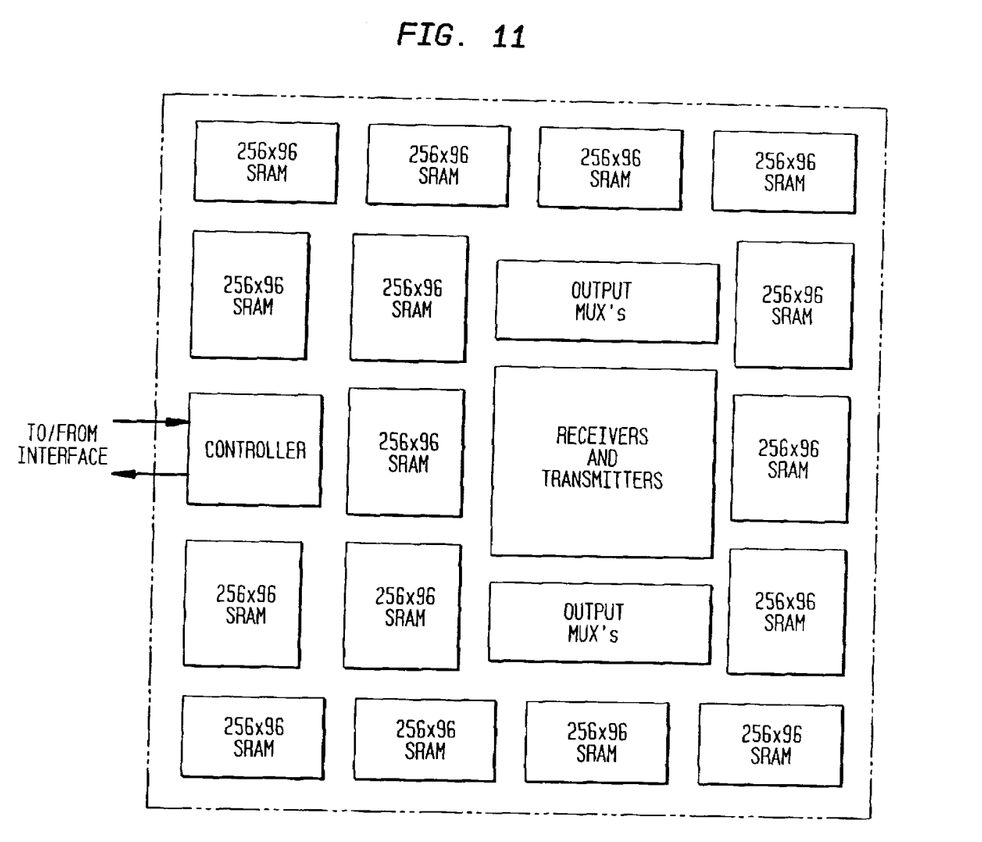
FIGS. 11 and 12 are floor plans for optimized PRAM and PFFT chips in accordance with the present invention.

The photonic RAM (PRAM) chip integrates sixteen 256×96 SRAM's on a single chip using the floorplan shown in FIG. 11. This yields a sum of over 2.5 million transistors in an estimated 1 cm×1 cm die area. The 768 optical inputs and 768 optical outputs are arranged as a 48×32 transmitter-receiver array in the center of the PRAM chip. The receiver amplifier and transmitter driver circuits are placed directly under the quantum well diode array. This centralized floorplan allows for efficient wire routing between the SRAM's and the transmitter-receiver array. Data received by the quantum-well diode array is reallocated by the data-output multiplexers shown in FIG. 11 when the data is supplied to transmitters on the PRAMs. The staging of the FFT calculation is coordinated between the PFFT and PRAM chips by an off-chip user interface device, such as a personal computer system through the lines to and from the interface shown in FIGS. 11 and 12.

This PRAM chip supports simultaneous READ and WRITE access to permit its application to both the single-FFT system of FIG. 8 and multi-FFT processor systems where simultaneous read-write is required for efficient operation. In the single-FFT mode, the power consumption is reduced since only eight SRAM's out of 16 are active at any single time, producing an estimated on-chip power consumption of:

$$P_{diss} = P\left(\text{optical}\frac{I}{O}\right) + 8 \times P(256 \times 96 \text{ SRAM}) =$$

$$3.1 \text{ W} + 8 \times (328 \text{ mW}) = 5.72 \text{ W}$$

In the multi-FFT mode, twelve of the sixteen SRAM's are being accessed at the time. The resulting on-chip power consumption is estimated as:

$$P_{diss} = P\left(\text{optical}\frac{I}{O}\right) + 12 \times P(256 \times 96 \text{ SRAM}) =$$

$$3.1 \text{ W} + 12 \times (328 \text{ mW}) = 7.04 \text{ W}$$

The implementation of the radix-2 butterfly processor architecture described above using a fixed-point 2's-complement arithmetic requires 70,136 transistors in a 1.9 mm×2.8 mm area. Power consumption when operating at 150 MHZ with 50% switching factor is estimated at 474 mW. The design is fully pipelined and can compute a new radix-2 butterfly in every clock cycle. The pipeline latency is 3 clock cycles. The processor has 96 inputs for two 48-bit complex numbers with 24-bit real and 24-bit imaginary parts. Similarly, 96 outputs are used for two 48-bit complex numbers. There are 32 input ports to bring in one 32-bit fixed-point complex twiddle coefficients with 16-bit real and 16-bit imaginary parts.

As shown in FIG. 12, the photonic FFT (PFFT) chip integrates eight radix-2 butterfly processors and two 512× 128 twiddle-storage SRAM's on a single chip. This packs over 1.4 million transistors into a die area approximately 1.2 cm square. An array of 768 optical inputs and 768 optical outputs are arranged as a 48×32 transmitter-receiver section in the center of the PFFT chip. The receiver and transmitter amplifier drive circuits are located directly under the quantum well diode array in this central section. This central I/O section allows for efficient wire routing between the eight processor modules and the diode array.

The PFFT chip operates in pipelined mode computing eight radix-2 butterflies every clock cycle, with 768 optical inputs received and 768 optical outputs transmitted. The twiddle coefficients used are stored directly on the PFFT chip in two banks of 512×128 SRAM's prior to the FFT calculation. This memory capacity supports FFT calculations for as many as 8192 points. The power consumption for the PFFT chip is estimated at:

$$P_{diss} = P\left(opt.\frac{I}{O}\right) + 8 \times P(PE) + 2 \times P(512 \times 128 \text{ SRAM}) =$$

$$3.1 \text{ W} + 8(474 \text{ mW}) + 2(560 \text{ mW}) =$$

The photonic design in accordance with the present invention, provides higher chip pin-count and off-chip I/O bandwidth, compared with hard-wired electronic implementations. Specifically, the PFFT and the PRAM chips have the following:

PINOUT=8 (PEs)×[48*2(inputs)+48*2(outputs)]=1,536 outputs

BANDWIDTH=1,536×150 MHZ=230,400 Mbit/sec=29 Gbytes/sec

This increases off-chip bandwidth by an order of magnitude that of over conventional silicon FFT implementations. In the single PFFT embodiment, on-chip power density is less than 10 Watts/cm$^2$, predominantly used for the switching of internal computational elements.

An 8,192-point complex FFT calculation, the largest task possible for the cascaded PFFT processors requires N/2 xlog$_2$N, that is, 53,248 of the radix-2 butterfly processors for strictly parallel implementation. When implemented using the 8-BP PFFT chip in the simple configuration shown in FIG. 8, this FFT calculation requires a total of 53,248/8 passes, each pass being 6.7 nsec long at a clock rate of 150MHz, for a total computation time of 44 μsec. For a simpler 1,024-point complex FFT calculation only 4.3 μsec is required. The cascaded system of FIG. 9 completes this 1K benchmark FFT in only 0.44 μs. Conventional hardwired electronic processors require between 30 μsec and 900 μsec to complete the same task.

Thus, at the chip-level, the PFFT chip clearly outperforms electronic designs. At the board level, the performance advantage of the photonic chip set is not as clear. Since the conventional electronic systems have difficulty achieving 29 Gbyte/sec interchip communication, they partition the FFT computation to achieve maximum performance and reduce off-chip I/O. Typically, each radix-2 or higher-radix butterfly processor is implemented on a single chip, data is fed to it from an SRAM, and the processors are then pipelined to execute the log$_2$N stages of the FFT computation. These processor systems can equal and even exceed the performance of the three-chip system shown in FIG. 8. However, they require many more chips to achieve this. For example, thirteen radix-2 processor chips (log$_2$8192=13) and 26 48-bit-wide SRAM chips are required for the 8,192-point task. The smart-pixel interconnection instead of the 3 chips shown in FIG. 8 provided in accordance with the present invention thus provides FFT systems having a smaller size and lower power consumption.

The higher-performance smart-pixel FFT processor operates multiple photonic FFT and RAM chips in a pipelined fashion shown in FIG. 9. In this approach, the latency remains the same, but throughput increases dramatically and can achieve an order-of-magnitude performance improvement. For the 8,192-point complex FFT, 13 cascaded PFFT's and 14 PRAM's are needed, for a total of 27 chips. Unlike the simple system of FIG. 8 where the data must "ping-pong" back and forth, the cascaded PFFT chips provide a straight-through pipeline, in which a new FFT is calculated every time a complete pass is made through to the last stage. The resulting throughput rate provides another completed FFT every 3.4 μsec. Thus, for a 1024-point complex FFT, 0.44 μsec are required. The performance of this system exceeds all conventional electronic FFT processor designs. These pipelined systems provide increased external bandwidth as well, making them particularly useful in focal plane arrays, because sensor data can be captured and passed to the processor array in realtime when its external bandwidth is wide enough, without creating a bottleneck.

The present invention offers a greatly flexible, high-performance, low chip-count solution to the numerous applications that require a high-speed FFT calculation. Performance benchmarks show that the embodiment of FIG. 8 is the fastest among the lower cost, lower chip count FFT processor system, computing a 1,024-point complex FFT in 4.3 μsec using a system with one PFFT chip and two PRAM chips. For example, a conventional electronic system using a single Sharp LH9124 processor chip with auxiliary SRAM and glue-logic chips requires 87 μsec for that same computation.

The cascaded PFFT embodiment of FIG. 9 outperforms conventional electronic implementations having a comparable chip count. A new 1,024-point complex FFT in every 0.44 μsec using a fully pipelined system with 10 cascaded PFFT chips and 11 PRAM chips. A conventional high-performance electronic system that uses 4 Sharp LH9124 FFT processor chips, 12 Sharp LH9320 address generator chips, 12 SRAM chips, and sundry glue-logic chips requires 31 μsec, not 0.44 μsec, for the same computation. More importantly, optical interconnects much higher to provide a higher I/O bandwidth that makes them responsive to realtime data streams.

The modular PFFT/PRAM chipsets' cascadable interconnection allows the designer to tailor the speed and size of the system. Any size task from a 16-point task to an 8,192-point FFT calculation, and task sizes for any power of 2 between these limits, can be performed without modifying the PFFT chip. The PRAM capacity used is scaled accordingly. For example, a 16,384-point FFT requires a doubling of PRAM memory capacity. Electronic 3-D memory stacking technology can be used to achieve order-of-magnitude in PRAM capacity. Although the 8-BP chips are particularly advantageous for conventional FFT applications, a greater number of radix-2 BP devices can be included on the PFFT chip to enhance performance for special FFT applications. For example, doubling the number of radix-2 BP devices on the PFFT chip doubles performance, and also increases the available off-chip optical I/O capacity.

The invention has been described with particular reference to a presently-preferred embodiment thereof. However, it will be immediately apparent to one skilled in the art that variations and modifications are possible within the spirit and scope of this invention, which is defined by the claims appended below.

For example, the direct, one-to-one connections are advantageous because they are compatible with a number of emerging three-dimensional free-space optoelectronic packaging technologies, but other partitioning options are possible. Also, although fixed-point complex number arithmetic is used in the disclosed embodiments, the precision of the FFT calculation can be increased by a simple modification to provide block-floating point values, as is well-known in the art. True floating-point implementation would significantly increase the complexity and transistor count of the PFFT chip.

What is claimed is:

1. Apparatus for calculating a fast Fourier transform for a plurality of data points in a plurality of stages, said processor comprising:

an array of electrically interconnected processor devices, said array including optical interconnection pixels disposed to transfer data to and from said array of processor devices;

a source of factor values, said source including a factor multiplexer, said factor values being supplied by said multiplexer to said respective processor devices in said array;

a random access memory device, said memory device including optical interconnection pixels disposed to transfer data between said memory device and said optical interconnection pixels of said array of processor devices; and a dual-port in said random access memory device, said dual port permitting data to be read and written in adjacent addresses simultaneously.

2. Apparatus for calculating a fast Fourier transform for a plurality of data points, said apparatus comprising:

multiple processor modules, each module having an array of electrically interconnected processor devices, said module including optical interconnection pixels disposed to transfer data to and from said module for said array of processor devices and a source of factor values, said source including a factor storage device and a factor multiplexer, said factor values being supplied by said multiplexer to respective processor devices in said array from said storage device;

a random access memory module, said memory module including optical interconnection pixels disposed to transfer data between said memory device and said optical interconnection pixels of said array of processor devices;

address control means for providing addressable read-write access between said multiple processor modules and said random access memory module; and an optical relay that provides cascaded interconnection of said processor modules through said memory module, such that one processor module writes a first FFT result in a first ordering provided by said one processor module to a first address and a second processor module reads said FFT result stored at said first address in a second ordering provided by said memory device and uses said first FFT result to produce a second FFT result.

3. A method for calculating a fast Fourier transform for a plurality of data points in a plurality of stages using an array of electrically interconnected processor devices and a random-access memory device, said method comprising the steps of:

optically supplying respective data-point values to said electrically-interconnected processor devices;

supplying a respective factor value to each respective processor device for use in each respective stage of the calculation;

optically transmitting an output of said electrically interconnected processor devices to respective addresses in said random-access memory device; and providing a dual-port on said random access memory device so that data can be read and written in respective adjacent addresses simultaneously.

4. A method of calculating a fast Fourier transform for a plurality of data points, in a plurality of stages using arrays of electrically interconnected processor devices and a random-access memory device, said method comprising the steps of:

optically multiplexing processors in the processor arrays with respective addresses in a random access memory device;

storing twiddle-factor values in each processor array and multiplexing said twiddle-factor values to respective processor devices in said array;

selecting addresses for read-write access between said processor array and said random access memory so that data from a previous stage can be read directly into a processor device for the next stage; and using a dual-port to permit processors to read from and write to adjacent addresses in said memory simultaneously.

5. Apparatus for calculating a fast Fourier transform for a plurality of data points in a plurality of stages, said processor comprising:

an array of electrically interconnected processor devices, said array including optical interconnection pixels disposed to transfer data to and from said array of processor devices;

a source of factor values, said source including a factor multiplexer, said factor values being supplied by said multiplexer to said respective processor devices in said array;

a random access memory device, said memory device including optical interconnection pixels disposed to transfer data between said memory device and said optical interconnection pixels of said array of processor devices; and shuffle means in said memory device for providing a reallocation of data stored in said memory device to interconnection pixels on said memory device between stages so that data from a previous stage can be read directly into a next stage without reallocating interconnection pixels used to read data from said previous stage.

6. Apparatus for calculating a fast Fourier transform for a plurality of data points in a plurality of stages, said processor comprising:

an array of electrically interconnected processor devices, said array including optical interconnection pixels disposed to transfer data to and from said array of processor devices;

a source of factor values, said source including a factor multiplexer, said factor values being supplied by said multiplexer to said respective processor devices in said array;

a random access memory device, said memory device including optical interconnection pixels disposed to transfer data between said memory device and said optical interconnection pixels of said array of processor devices; and a smart pixel device, said smart pixel device providing a space-division relay for beams providing data transfers between said array and said random-access memory device.

7. Apparatus for calculating a fast Fourier transform for a plurality of data points in a plurality of stages, said processor comprising:

an array of electrically interconnected processor devices, said array including optical interconnection pixels disposed to transfer data to and from said array of processor devices;

a source of factor values, said source including a factor multiplexer, said factor values being supplied by said multiplexer to said respective processor devices in said array;

a random access memory device, said memory device including optical interconnection pixels disposed to transfer data between said memory device and said optical interconnection pixels of said array of processor devices;

an optical-polarization space-division relay between said memory device and said array of processor devices, said space-division relay directing an array of data beams to and from said memory device;

address control means on said memory device for directing data from addresses in said memory device to selected optical interconnection pixels on said memory device so that said data received by said array of processor devices has an ordering that is shuffled relative to an ordering of said data when stored in said memory device.

8. A method for calculating a fast Fourier transform for a plurality of data points in a plurality of stages using an array of electrically interconnected processor devices and a random-access memory device, said method comprising the steps of:

optically supplying respective data-point values to said electrically-interconnected processor devices;

supplying a respective factor value to each respective processor device for use in each respective stage of the calculation;

optically transmitting an output of said electrically interconnected processor devices to respective addresses in said random-access memory device;

selecting pixels for outputting data stored in a first ordering in said addresses in a second ordering so that data from a previous stage can be read directly into a processor device for the next stage.

9. A method for calculating a fast Fourier transform for a plurality of data points in a plurality of stages using an array of electrically interconnected processor devices and a random-access memory device, said method comprising the steps of:

optically supplying respective data-point values to said electrically-interconnected processor devices;

supplying a respective factor value to each respective processor device for use in each respective stage of the calculation;

optically transmitting an output of said electrically interconnected processor devices to respective addresses in said random-access memory device; and space-division relaying to direct the transmission of data beams between said array and said random-access memory device.

10. A method for calculating a fast Fourier transform for a plurality of data points in a plurality of stages using an array of electrically interconnected processor devices and a random-access memory device, said method comprising the steps of:

optically supplying respective data-point values to said electrically-interconnected processor devices;

supplying a respective factor value to each respective processor device for use in each respective stage of the calculation;

optically transmitting an output of said electrically interconnected processor devices to respective addresses in said random-access memory device; and providing optical-polarization space-division relaying between the memory device and the array of processor devices for directing an optical array of data beams to and from said memory device.

* * * * *